(12) United States Patent
Watanabe et al.

(10) Patent No.: US 6,771,447 B2
(45) Date of Patent: Aug. 3, 2004

(54) DISC DRIVE APPARATUS

(75) Inventors: Tomo Watanabe, Tsurugashima (JP);
Koichi Nagaki, Tsurugashima (JP);
Michihiro Kaneko, Tsurugashima (JP);
Keiichi Yamauchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 486 days.

(21) Appl. No.: 09/839,540

(22) Filed: Apr. 23, 2001

(65) Prior Publication Data

US 2001/0050823 A1 Dec. 13, 2001

(30) Foreign Application Priority Data

Apr. 24, 2000 (JP) ........................................ 2000-123262

(51) Int. Cl.⁷ ............................ G11B 15/18; G11B 21/02
(52) U.S. Cl. ............................. 360/69; 360/75; 360/31
(58) Field of Search ............................... 360/75, 69, 5, 360/6, 31; 711/112; 701/33, 1

(56) References Cited

U.S. PATENT DOCUMENTS

| | | | | |
|---|---|---|---|---|
| 4,103,338 A | * | 7/1978 | Cizmic et al. | 714/42 |
| 4,860,124 A | * | 8/1989 | Adams | 360/6 |
| 5,103,394 A | * | 4/1992 | Blasciak | 714/47 |
| 5,794,164 A | * | 8/1998 | Beckert et al. | 455/3.06 |
| 5,889,629 A | * | 3/1999 | Patton, III | 360/75 |
| 6,064,539 A | * | 5/2000 | Null et al. | 360/75 |
| 6,546,456 B1 | * | 4/2003 | Smith et al. | 711/112 |

* cited by examiner

*Primary Examiner*—David Hudspeth
*Assistant Examiner*—K. Wong
(74) *Attorney, Agent, or Firm*—McGinn & Gibb, PLLC

(57) ABSTRACT

A disc drive arrangement adapted to move a head to a retract position upon shutting down of a power source voltage, wherein the number of retraction actions of the head is counted and notified. With this notification, a user can assume performance deterioration of the disc drive arrangement.

26 Claims, 9 Drawing Sheets

DISC DRIVE APPARATUS

BACKGROUND OF THE INVENTION

1. Field of the Invention

The present invention relates to a disc drive apparatus for playing or driving an information recording disc such as a magnetic disc.

2. Description of the Related Art

Hard disc drive (HDD) apparatus have prevailed as external memory devices for personal computers, and home-use electric/electronic appliances that have a built-in HDD are also marketed recently because recording density (or memory density) of HDD is improved and price reduction is realized. It is now possible to store a substantial amount of image and music contents in HDD so that products using HDD are manufactured one after another. Such products are expected to be incorporated in automobile audio sets, and it is assumed that most automobile navigation systems will be equipped with HDD although DVD is currently dominant.

Figure 1:
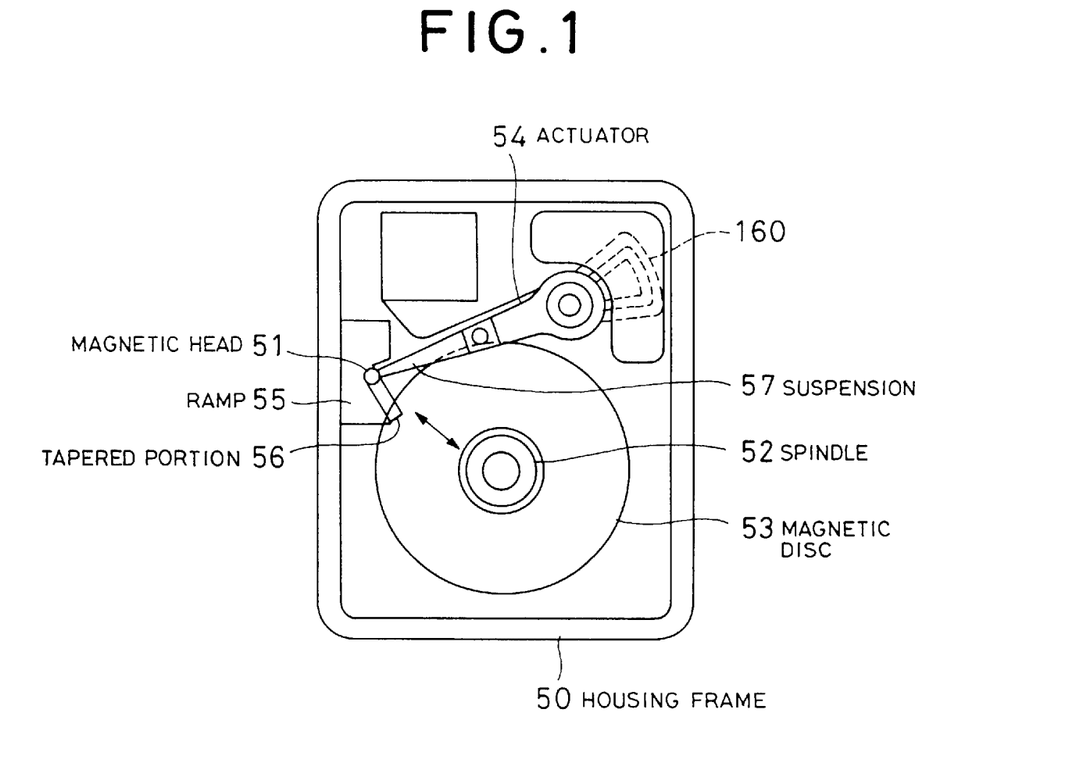
FIG. 1 is a plan view showing a fundamental structure of a ramp-load type HDD.

Referring to FIG. 1 of the accompanying drawings, illustrated is a basic structure of HDD. The illustrated HDD is a ramp loading type wherein a magnetic head 51 located at a free end of an actuator 54 is mechanically caused to float from a magnetic disc surface.

As illustrated, the magnetic head 51 mounted on the actuator 54 is adapted to be able to move in a radial direction of a magnetic disc 53 (as indicated by the double arrow), and be positioned by a voice coil motor (VCM) 160. The magnetic head 51 is forced on the surface of the magnetic disc 53 with a resilient force of a suspension 57, but is controlled such that a gap of several tens of micrometers is created between the magnetic head 51 and the magnetic disc surface by an aerodynamic floating force acting on the magnetic head 51 produced upon rotations of the magnetic disc 53. When not operated, the magnetic head 51 is positioned at a retracted position, at which it rides on a tapered portion 56 of a ramp 55 formed at one end of a housing frame 50.

Figure 2:
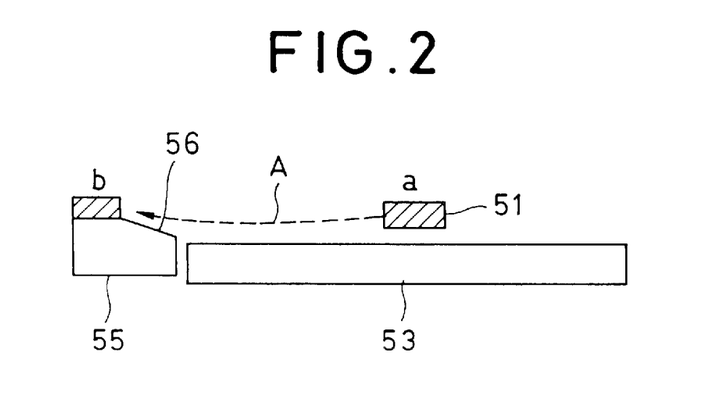
FIG. 2 is a cross sectional view showing positional relationship between a ramp and a head shown in FIG. 1.

FIG. 2 is a cross sectional view illustrating positional relationship between the magnetic head 51 and ramp 55. As shown, the ramp 55 located in the vicinity of an outer periphery of the magnetic disc 53 has the tapered portion 56 that extends in a radially outward direction of the disc. This tapered portion 56 has a gentle inclination extending in a direction apart from the surface of the magnetic disc 53. The magnetic head 51 is located at a play position (position "a") above the magnetic disc 53 with a suitable clearance when it reads or writes information out of or into the magnetic disc 53 (i.e., drive condition). When not operated (unload condition), the magnetic head 51 moves over the tapered portion 56 and reaches the shunting position (or stand-by position) "b" as indicated by the arrow A.

OBJECTS AND SUMMARY OF THE INVENTION

The above described HDD apparatus is equipped with a function called "emergency unload". The emergency unload function forcibly moves the head to the retract position when a power supply to a motor for driving a spindle 52 and magnetic head 51 fails, in order to prevent the magnetic disc 53 from being damaged by the head. Although a power source is needed to perform the emergency unloading, it is known that when the power supply fails, a counter electromotive force generated by inertia rotations of the spindle motor 52, i.e., no load electromotive force, can be utilized to carry out the emergency unloading.

If the above described technique is applied to an engine-driven on-vehicle disc drive apparatus, the emergency unloading operation is executed every time the engine is started up since a battery voltage greatly drops upon starting up of the engine.

Figure 3:
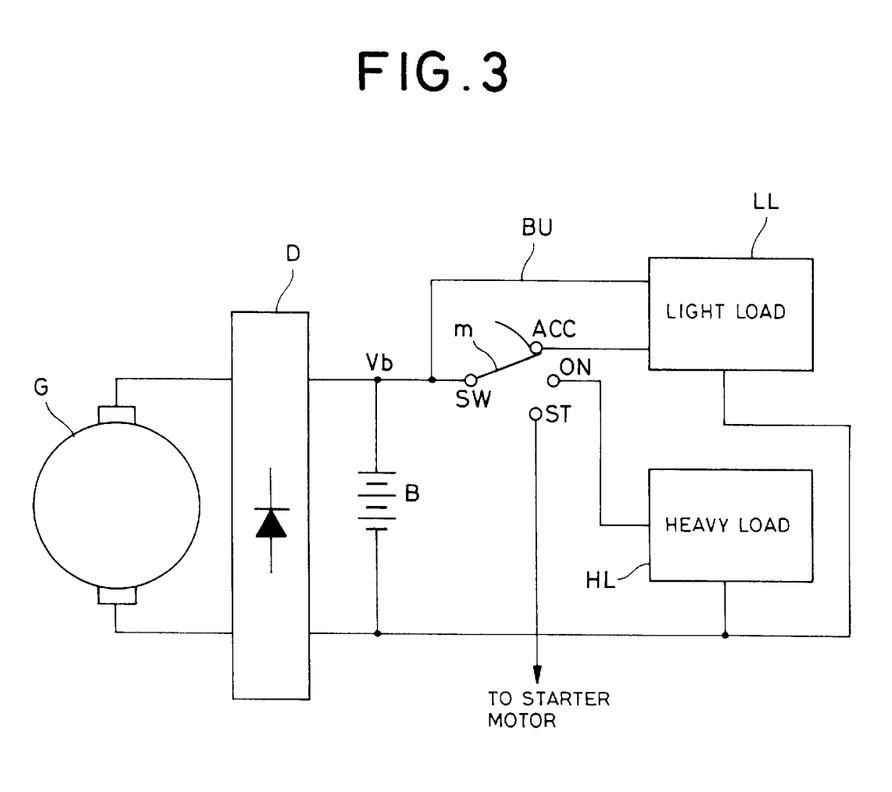
FIG. 3 illustrates a circuit diagram of power supply lines on vehicle.

Referring to FIG. 3, illustrated is an example of a power source circuit employed in the engine-driven automobile. Specifically, an alternator G is driven by an engine (not shown). An AC power supplied from the alternator G is rectified and smoothed by a rectifier D and then fed to a battery B. A battery voltage Vb of the battery B is fed to a movable contact of an engine key switch SW. The engine key switch SW has stationary contacts ACC, ON and ST, and the battery voltage Vb passing through the contact ACC is supplied as an ACC power source to a light load LL such as an audio set. The battery voltage Vb passing through the contact ON is supplied as an ON power source to a heavy load HL such as power window. The battery voltage Vb passing through the contact ST is supplied as MST voltage to a starter motor (not shown) to rotate the starter motor and start the engine. The battery voltage Vb is also fed to the light load LL via a line BU as a back-up power source.

Figure 4A:
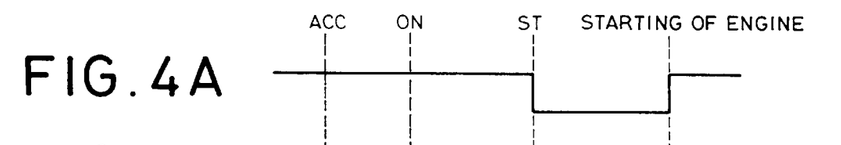
FIGS. 4A and 4B illustrate timing charts to show an operation sequence of the on-vehicle power sources when an engine is started.
Figure 4B:
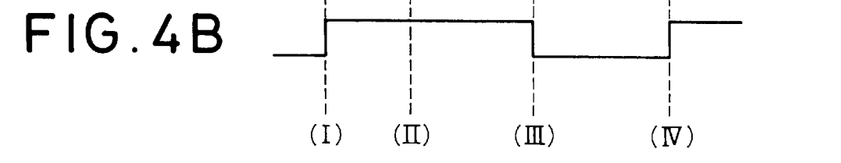

FIGS. 4A and 4B illustrate voltage changes in the power supply lines in the form of timing charts when the engine is started. Specifically, FIG. 4A illustrates the power source voltage for the back-up power source, and FIG. 4B illustrates the voltage change for the ACC. In these drawings, timing (I), (II), (III) and (IV) correspond to different positions of the engine key switch. Specifically, (I) indicates when the engine key is in the ACC position, which feeds electricity to the light load such as the audio equipments, (II) indicates when the engine key is in the ON position, which feeds electricity to the heavy load such as the power window device, (III) indicates when the engine key is in the ST position, which feeds electricity to the starter motor, and (IV) indicates when the engine key is returned to the ON position.

In this arrangement, not only the ACC voltage but also the back-up power supply drop in certain occasions because of the battery voltage drop upon starting of the engine (between (III) and (IV) in FIGS. 4A and 4B).

When, therefore, the above described HDD is employed in an engine-driven vehicle, the emergency unload operation likely takes place every time the engine is started, because of voltage drop upon starting of the engine. Since, as mentioned above, the emergency unloading takes advantage of counter electromotive force of the spindle motor and forcibly causes the head to move, the magnetic head 51 in a product used for a vehicle has more chances to collide against the taper portion 56 of the ramp 55 while it is moving to the shunting position "b" of the ramp 55 than a product such as personal computer used for other than the vehicle. In other words, the ramp 55 and magnetic head 51 in the HDD apparatus used for the vehicle need to have improved durability.

This is a common problem in the HDD apparatus operated under an unstable power supply.

The present invention is conceived in view of the above described problems, and has an object to provide a disc drive apparatus that does not have shortened durability even if operated under an unstable power supply.

In order to solve the above-mentioned problem, there is provided a disc drive apparatus adapted to write and/or read information into and/or from an information recording disc, with the information recording disc being rotated by a rotary drive motor and a head drive being controlled to position a head in a radial direction of the information recording disc under supply of predetermined rated power source voltage, comprising: a forcible restoration device for controlling the head drive to execute a forcible restoration action that forcibly moves the head to a shunting position when the power source voltage drops below a predetermined threshold value; a detection and count device for detecting execution of the forcible restoration action, counting how many times the forcible restoration action is executed, and updating a count value every time execution of the forcible restoration action is detected; and a notification device for notifying an updated count value.

With the arrangements mentioned above, times of the emergency unloading occurs are monitored and informed to a user through a display, for example, so that the user is notified of an operating condition of a disc drive apparatus and the user's attention is drawn to when the disc drive apparatus should be replaced and the like. This improves reliability of the disc drive apparatus as a recorded information reproducing apparatus. Even if further, a power supply to the disc drive apparatus is interrupted, it is possible to insure the emergency unloading operation to occur by using a counter electromotive force generated because of inertia rotations of a recording medium and drive means. Moreover, notification and caution to the user is made with different colors depending upon how many times a forced movement occurs so that the user is more effectively notified of when the user should replace the disc drive apparatus and the like. Use of different colors has a greater impact on the user.

DETAILED DESCRIPTION OF THE INVENTION

Figure 5:
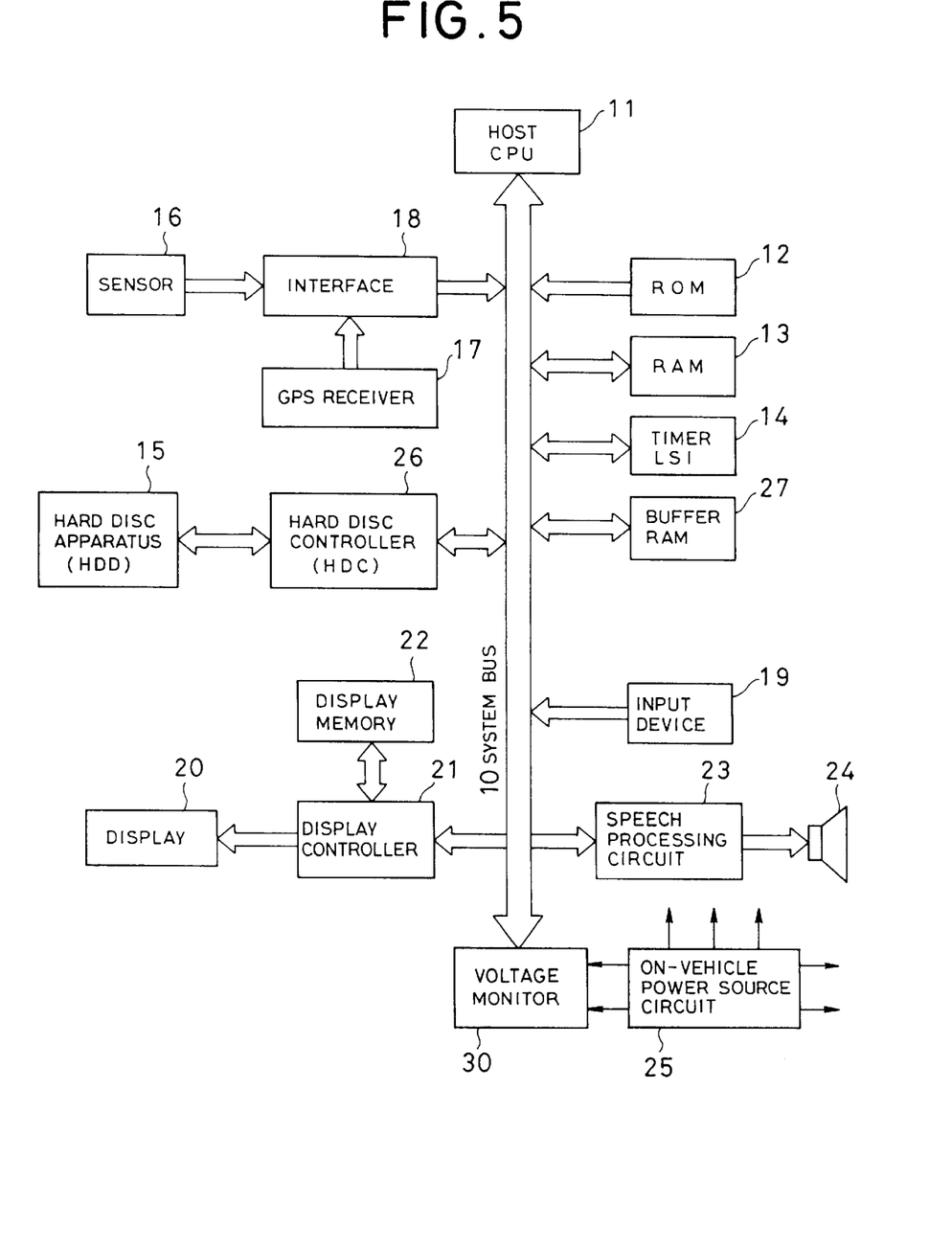
FIG. 5 is a block diagram illustrating a car navigation system that incorporates the disc drive apparatus of the present invention.

Referring to FIG. 5, illustrated is a block diagram of a car navigation system including HDD of the present invention. HDD is used here as a map information storage device of the car navigation system. It should be noted that application of HDD according to the present invention is not limited to the car navigation. The illustrated car navigation system includes a host CPU 11 as its main controller. It also includes ROM 12, RAM 13, timer LSI 14, hard disc apparatus (HDD) 15, sensor part 16, GPS receiver 17, interface 18, input device 19, display 20, display controller 21, display memory 22, voice processing circuit 23, speaker 24, power supply circuit 25, hard disc controller (HDC) 26 and buffer RAM 27.

The host CPU 11 performs an overall control with respect to navigation such as destination retrieval and route guiding by cooperating with the display controller 21 based on programs stored in ROM 12 and RAM 13 in response to commands from a user supplied from the input device 19. The host CPU 11 also utilizes geographical information obtained from the sensor 16 and GPS receiver 17 during the control. The timer LSI 14 has a time count value, which is programmable set by the host CPU 11, and issues interruption upon elapsing of the set time, thereby entrusting the processing to an interruption routine.

HDC 26 carries out a format control on a magnetic disc loaded into HDD 15, and also serves as host interface and HDD interface.

The sensor part 16 represents various sensors needed for the car navigation system to conduct autonomous driving and includes, for instance, a vehicle speed sensor and a gyro-sensor. The sensor part is connected to a system bus 10 via the interface 18. The interface 18 also receives an output from the GPS receiver 17 so that a hybrid drive control is performed by combination of GPS measured position and autonomous driving.

The display 20 is a liquid crystal monitor, for example. The display controller 21 writes processed contents such as map information, which is written in the display memory 22 by the host CPU 11, into the display 20, and the display 20 shows it on its screen.

The input device 19 is a remote controller or console, and is used as GUI for inputting commands or talking to the navigation system through the display 20. The speech processing circuit 23 functions as GUI to issue a voice guide or talk to the navigation system by inputting a voice. The voice guide is output from the speaker 24. Reference numeral 25 designates a power source circuit to be carried by a vehicle and includes the back-up power supply line "a" and ACC power supply line "b" as described above.

Figure 6:
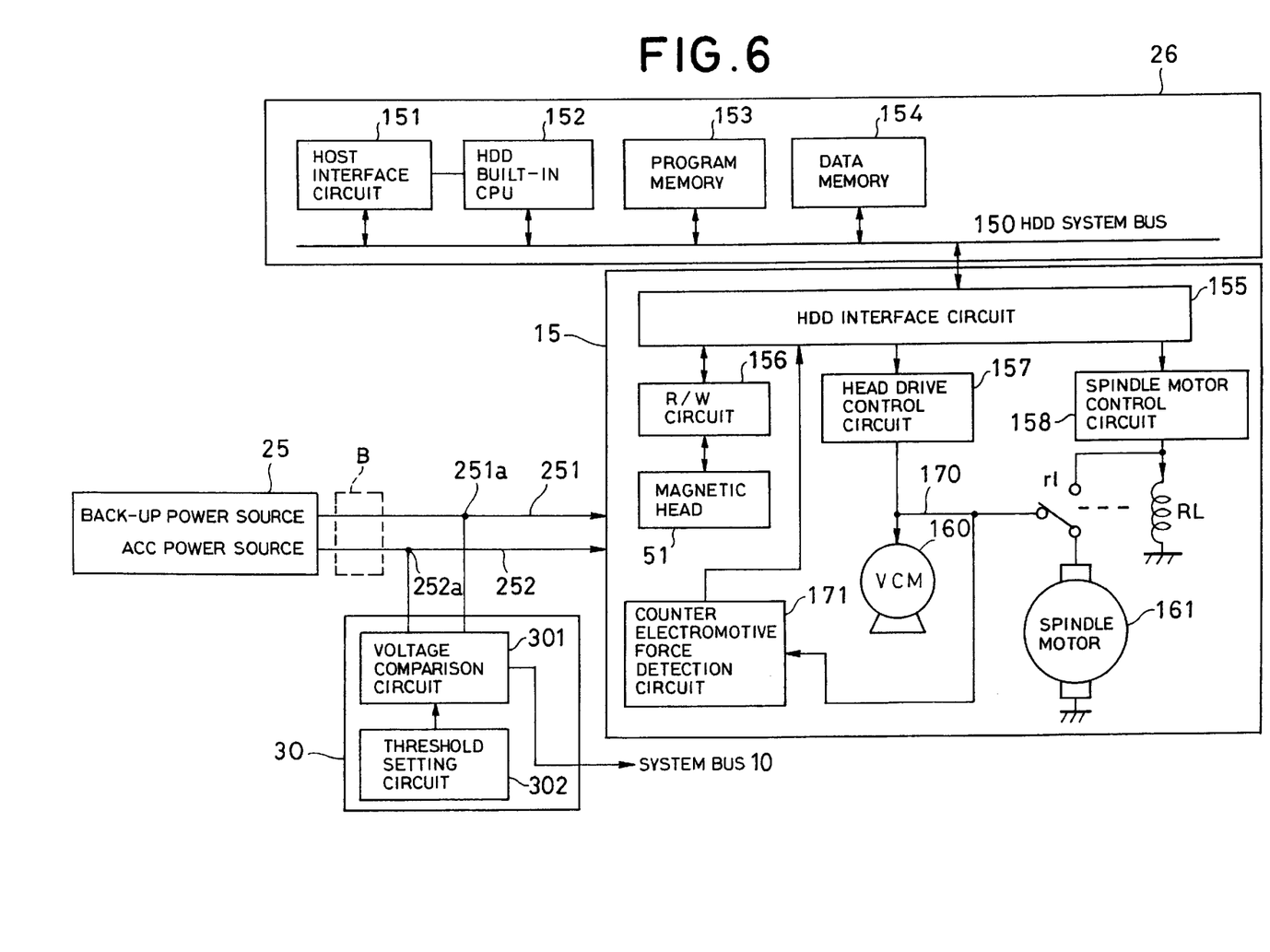
FIG. 6 illustrates a block diagram of HDD, HDC and voltage monitoring circuit shown in FIG. 5.

FIG. 6 illustrates a voltage monitoring device 30 for detecting a voltage of HDD 15 (FIG. 5) and voltages of the back-up power source and ACC power source of the on-vehicle power source circuit 25. The on-vehicle power source circuit 25 includes two power sources, one for the back-up power source line 251 and one for the ACC power source line 252. The voltage monitoring circuit 30 monitors voltage values on the power source lines 251 and 252 supplied from the two power sources mentioned above. A threshold setting circuit 302 has a determined threshold value to detect a voltage drop, and this threshold value is informed to a voltage comparison circuit 301.

HDC 26 includes a built-in CPU 152 as its core element, a host interface circuit 151, a program memory 153, a data memory 154, and an HDD system bus 150. HDD 15 includes a HDD interface circuit 155, a RIW (read/write) circuit 156, a head drive control circuit 157, a spindle motor control circuit 158, a magnetic head 51, a voice coil motor (VCM) 160, a spindle motor 161 and a counter electromotive force detection circuit 171.

The host interface 151, built-in CPU 152, program memory 153, data memory 154 and HDD interface circuit 155 are all connected to an HDD system bus 150.

The built-in CPU 152 of HDC 26 receives commands such as Seek, Read/Write, etc. from the host CPU 11 (FIG. 1) through the host interface circuit 151, and performs the control over the R/W circuit 156, head drive control circuit 157 and spindle motor control circuit 158 via the HDD interface circuit 155 based on the programs stored in the program memory 153. Data read from and written into the magnetic disc 53 via the magnetic head 51 is controlled by the R/W circuit 156. Operations (activation and movements) of VCM 160 are controlled by the head drive control circuit 157. Rotary movements of the spindle motor 161 are controlled by the spindle motor control circuit 158. For example, if the back-up power source and ACC power source both drop to 4.5V or less, relay RL deactivates and a counter electromotive force produced by inertia rotations of the spindle motor 161 is fed through a relay contact point rl and line 170. This is detected and informed to the HDD built-in CPU 152 by a counter electromotive force detection circuit 171.

It should be noted that a power supply switch dedicated for HDD may be provided at a position indicated by the broke line rectangle B, for example, upstream of monitor points 251a and 252a on the lines 251 and 252 of the voltage monitoring circuit 30.

Figure 7A:
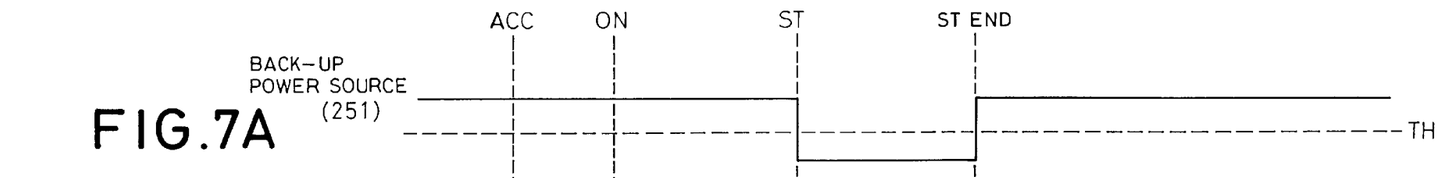
FIGS. 7A and 7B are timing charts showing voltage wave forms of the back-up power source and the ACC power source when the engine is started.
Figure 7B:
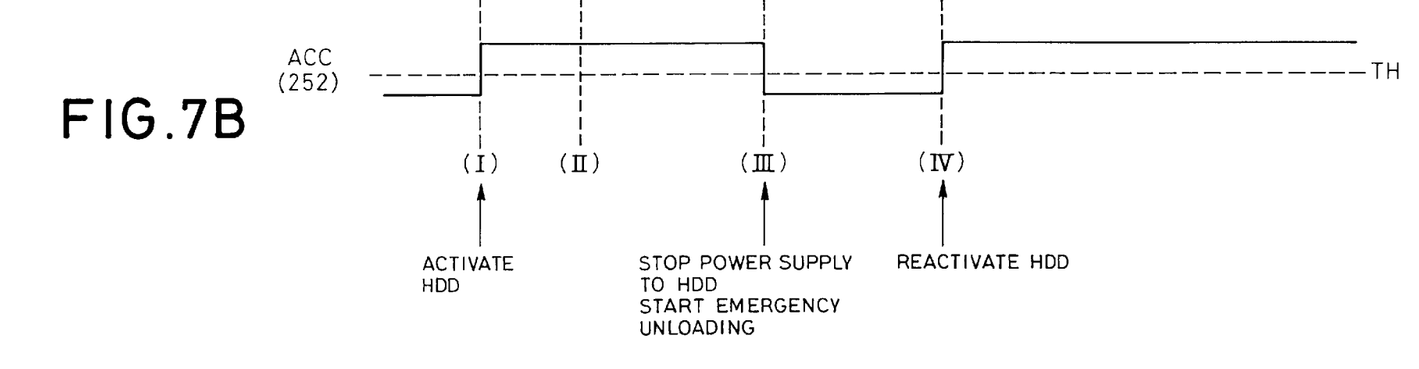

FIG. 7A illustrates a voltage wave of the back-up power source voltage fed through the back up power supply line 251, and FIG. 7B illustrates a voltage wave of the ACC power source voltage on the ACC power source line 252. The threshold value TH is a predetermined voltage value; 9V in this embodiment.

An operator inserts an engine key into the LOCK position to cancel a lock condition and turns the engine key to the ACC position (time I). This causes the ACC power source to rise and reach, for example, 12V. As the ACC power source voltages rises, electricity is fed to the car navigation system and the spindle motor 161 is activated. Subsequently, the engine key is turned to a start position (time III) via the ON position (time II), to start the engine start motor, whereby the voltages on the back-up power supply line 251 and ACC power supply line 252 both drop. At this point, the emergency unloading takes place in HDD 15. After a predetermined period, the engine is started, the engine key is returned (time IV), and the voltages of the ACC power supply line 252 and back up power supply line 251 rise to the initial voltage value 12V, thereby returning to the stable condition. This feeds the power source voltage again to HDD 15 to reactivate HDD 15. It should be noted that a period from the ACC position (II) to the motor start (III) and that from the motor start (III) to the engine start (IV) are random.

According to the present invention, the number of occurrences of the emergency unloading is monitored and informed to the user. This notifies the user of the operating condition of the disc and calls the user's attention to replacement of the disc or the like.

Figure 8A:
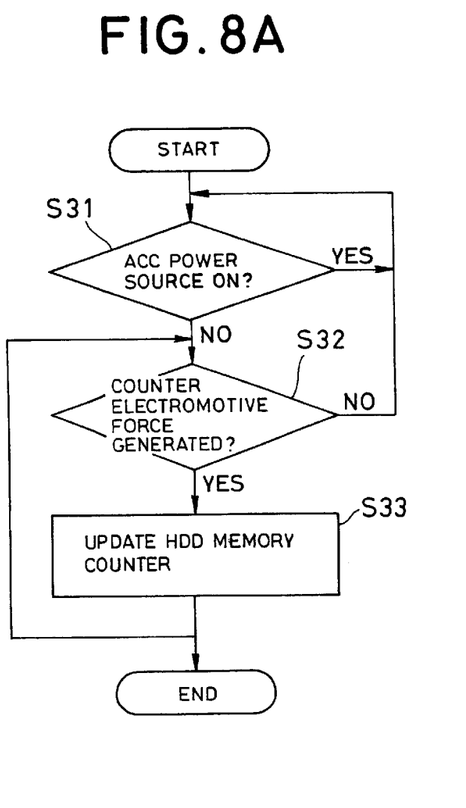
FIGS. 8A and 8B are flowcharts showing an example of operation mode of the disc drive apparatus according to the present invention.
Figure 8B:
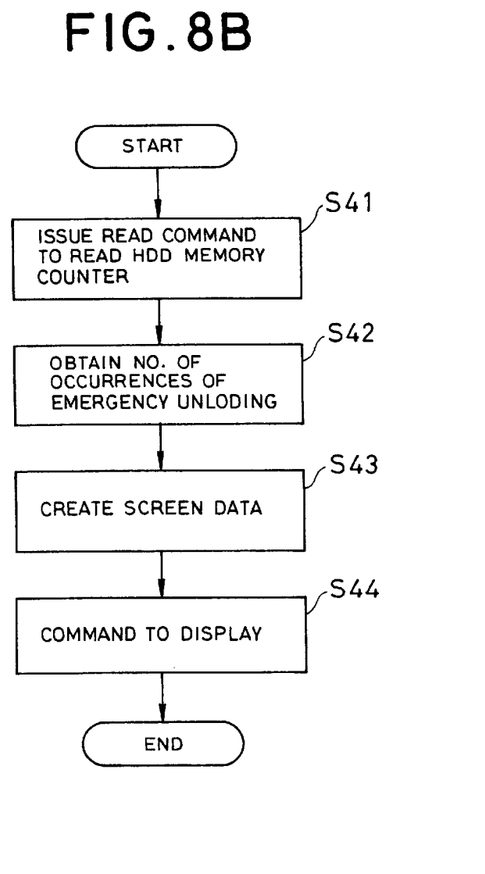

FIG. 8A illustrates an operation mode of the HDD built-in CPU 152 and FIG. 8B illustrates an operation mode of the host CPU 11.

First, it is determined whether the ACC power source is fed to HDD (Step S31). If no electricity is fed, it is then monitored whether a counter electromotive force is generated (Step S32). As described above, the magnetic head 51 is forced to return to the ramp position using the counter electromotive force of the spindle motor 161 during the emergency unloading. Therefore, it is possible to know the occurrence of the emergency unloading from an output of the counter electromotive force detection circuit 171 that detects the generation of the counter electromotive force of the spindle motor 161.

When the counter electromotive force is generated, a memory counter associated with the HDD built-in data memory 154 is updated (Step S33) to store the number of occurrences of the emergency unloading.

Figure 10:
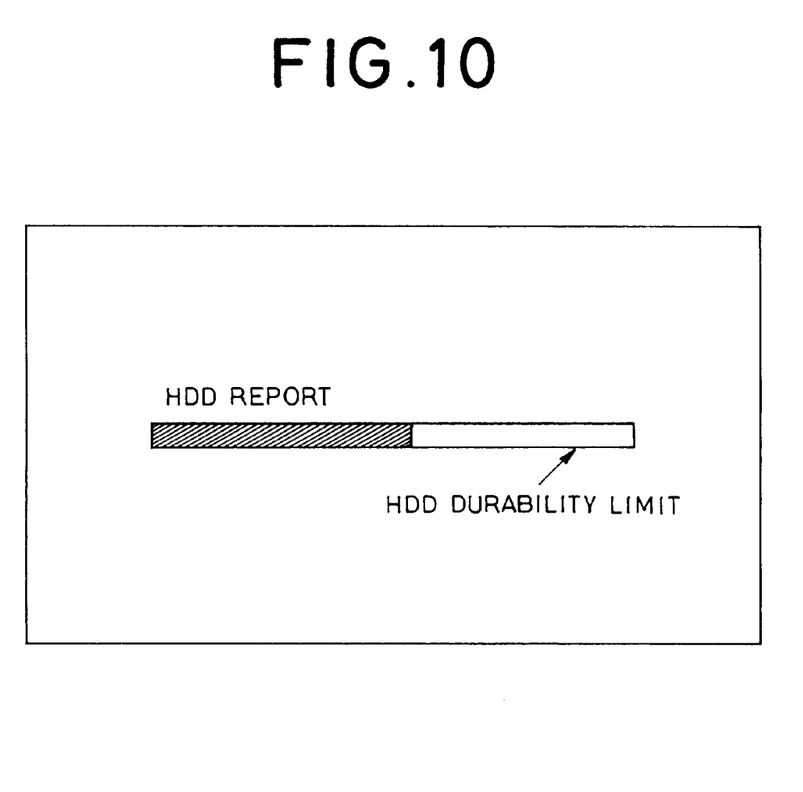
FIG. 10 depicts an example of a display screen for user notification according to the present invention.

In this manner, the HDD built-in CPU 152 always monitors generation of the counter electromotive force while the power is being fed to HDD 15, so as to store the number of the counter electromotive force generation. On the other hand, as illustrated in FIG. 8B as the power is supplied to the car navigation system, the host CPU 11 first issues a react command to HDD 15 (Step S41) and takes the counter value of the memory counter associated with the data memory 154 of HDD 15 to obtain the number of the emergency unloading as data (Step S42) in accordance with a routine shown in FIG. 8B. Then, the host CPU prepares screen data as shown in FIG. 10 and sends it on the display memory 22 (Step S43). The display controller 21 reads the display memory 22 in synchronization with a display timing to indicate the data on the display 20.

Thus, the host CPU 11 obtains the number of the emergency unloading ever time the power is supplied to the car navigation system, and commands the displaying on the display unit 20. It should be noted that the number of the emergency unloading may be displayed upon instructions from a user who operates the input device 19 rather than the occurrences of the power supply to the car navigation system.

Figure 9:
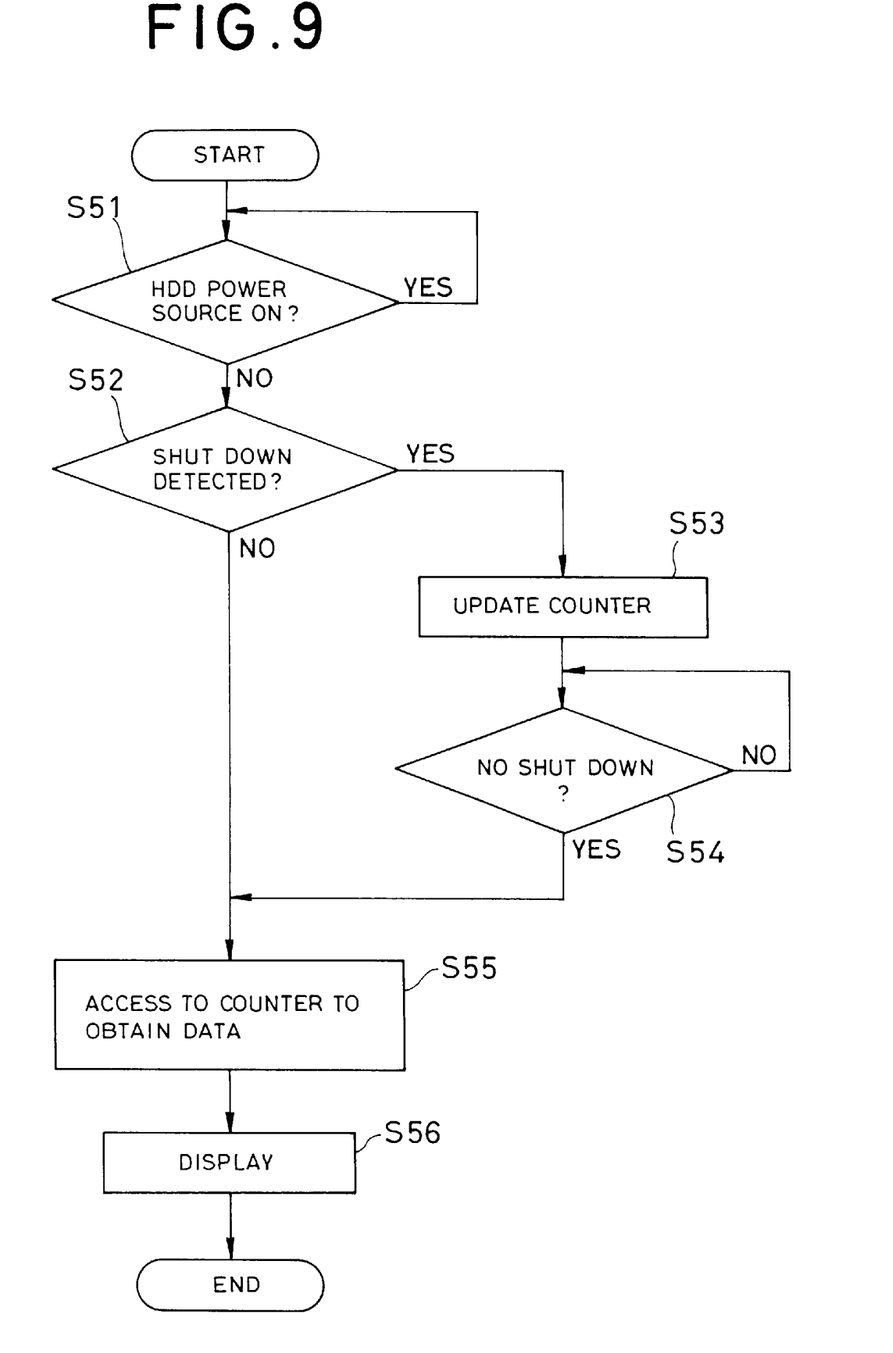
FIG. 9 is a flowchart showing another example of operation mode of the disc drive apparatus of the invention.

Referring to FIG. 9, illustrated is an example when the system (host CPU 11) accumulates and administers the number of the emergency unloading. As described in the foregoing, the emergency unloading occurs when both the ACC power source and back-up power source are shutdown (voltage down). For example, a counter is connected to a non-volatile memory such as the buffer RAM 27 to count how many times the shut down occurs and maintain its count value. By referring to this value upon activation of HDD 15, the number of the emergency unloading is administered. Specifically, the host CPU 11 first confirms the turning on of the power source of HDD 15 (Step S51). The host CPU 11 then accepts the shut down information from the voltage monitoring circuit 30. Here, a threshold value for shut down determination is 9V.

The voltage monitoring circuit 30 shown in FIGS. 5 and 6 always monitors whether both the ACC and back-up power source voltages drop below 9V (Step S52). If they become under 9V, the host CPU 11 updates the accessible counter (buffer RAM 27) to count the number of the emergency unloading (Step S53). When the power source-voltage rises beyond 9V and the shut down condition is no longer present (Step S54), then the host CPU refers to the counter value and obtains the number of the emergency unloading as data (Step S55). Subsequently, the host CPU creates the display data as shown in FIG. 10 and transmits it to the display memory 22. The display controller 21 reads the data from the display memory 22 in synchronization with the display timing such that the data is displayed on the display 20 (Step S56).

Even if no shut down occurs during the power source voltage monitoring performed by the voltage monitoring circuit 30, the host CPU 11 refers to the count value to obtain the number of the emergency unloading, creates the display data and transfers it to the display memory 22 for visual indication.

As described above, the host CPU 11 obtains the number of the power source voltage shut down and outputs a command to the monitor or the like to display it. It should be noted that the number of the shut down, i.e., emergency unloading, may be displayed upon a command from the input device 19 operated by the user in addition to upon occurrence of the shut down.

Referring to FIG. 10, illustrated is an example of a screen used when the number of occurrences of the emergency unloading is monitored and informed to the user according to the present invention. Here, it is entitled DD REPORT and indicated in the form of bar graph at the right corner of the screen of the display 20. Specifically, the unshaded bar graph is graduated transversely in the number of the emergency unloading (or percentage), and shaded to the right every time the emergency unloading takes place for notification. If the bar graph is divided into three areas colored with green, yellow and red from the left respectively, it provides more effective visual indication for the time of replacement.

It should be noted that the above described notification may be displayed in a whole screen if necessary upon a request from the user who operates the input device 19 or always displayed at the corner of the screen as shown in the drawing.

As understood from the foregoing, the present invention can provide a disc drive apparatus that monitors the number of occurrences of the emergency unloading and informs the user of it to let the user know the operating condition of HDD and call the user's attention to replacement and the like, thereby improving reliability. For example, the number of occurrences of the emergency unloading is indicated to the user through the display so that the user can recognize the operating condition of the disc drive apparatus and know when the user should replace the disc drive apparatus. In addition, the frequency of the forced movements of the disc head is displayed with different colors so that it is possible to notify the user more effectively of the time for replacement of the disc drive apparatus and other information.

This application is based on a Japanese patent application No. 2000-123262 which is hereby incorporated by reference.

What is claimed is:

1. A disc drive apparatus adapted to write and/or read information onto and/or from an information recording disc, with the information recording disc being rotated by a rotary drive motor and a head drive being controlled to position a head in a radial direction of the information recording disc under supply of a predetermined rated power source voltage, said disc drive apparatus comprising:

a forcible restoration device for controlling the head drive to execute a forcible restoration action that forcibly moves the head to a retract position when the power source voltage drops below a predetermined threshold value;

a detection and count device for detecting execution of the forcible restoration action, counting the number of times the forcible restoration action is executed, and updating a count value every time execution of the forcible restoration action is detected; and a notification device for providing a notification of the updated count value.

2. The disc drive apparatus according to claim 1, wherein the detection and count device detects the forcible restoration action by detecting a forcible restoration action itself which is executed by the forcible restoration device.

3. The disc drive apparatus according to claim 1, wherein the detection and count device detects the execution of the forcible restoration action by detecting a voltage drop detection signal from a voltage monitoring circuit indicating a drop of the power source voltage to a voltage below the predetermined threshold value.

4. The disc drive apparatus according to claim 1, wherein the forcible restoration device drives the head drive with a counter electromotive force generated by the rotary drive motor to execute the forcible restoration action.

5. The disc drive apparatus according to claim 4, wherein the detection and count device detects the forcible restoration action by detecting supply of the counter electromotive force of the rotary drive motor to the head drive.

6. The disc drive apparatus according to claim 1, wherein the power source voltage is fed from an engine-driven power source unit provided on a vehicle, and the detection and count device detects the execution of the forcible restoration action by detecting a voltage drop detection signal from a voltage monitoring circuit indicating a drop of the power source voltage below the predetermined threshold value after a rise of the power source voltage over the predetermined threshold value.

7. The disc drive apparatus according to claim 1, wherein the notification device continuously executes a notification action under supply of the power source voltage.

8. The disc drive apparatus according to claim 1, wherein the notification device executes a notification action for a short period every time supply of the power source voltage is started.

9. The disc drive apparatus according to claim 1, wherein the notification device executes a notification action in a visually recognizable manner.

10. The disc drive apparatus according to claim 9, wherein the notification device executes the notification action with a color pattern that changes with an increasing number of detections.

11. A disc drive apparatus as claimed in claim 1, wherein the notification device comprises a display device for providing a visual display of the updated count value.

12. A disc drive apparatus for writing and/or reading information onto and/or from an information disc, said disc drive apparatus comprising:

a rotary drive motor for rotating the information disc;

a head for writing and/or reading the information onto and/or from the disc;

a head drive for positioning the head in a radial direction of the disc;

a voltage input for providing a voltage to said rotary drive motor, said head, and said head drive;

a forcible restoration device for forcibly moving said head to a periphery of the disc when the voltage from said voltage source is below a predetermined level; and a counter for counting the number of times said forcible restoration device has forcibly moved said head to the periphery of the disc.

13. The disc drive apparatus as claimed in claim 12, further comprising a notification device for providing a notification of the counted number.

14. The disc drive apparatus according to claim 13, wherein the notification device continuously provides the notification of the counted number.

15. The disc drive apparatus according to claim 13, wherein the notification device provides the notification of the counted number for a short period of time each time providing of voltage by said voltage input is started.

16. The disc drive apparatus according to claim 13, wherein the notification device comprises a display device for providing a visual display of the counted number.

17. The disc drive apparatus according to claim 16, wherein the display device displays a colored pattern that changes with an increasing counted number.

18. The disc drive apparatus according to claim 12, wherein said counter counts in response to a drop in the voltage provided by said voltage input to a voltage value below the predetermined value.

19. The disc drive apparatus according to claim 12, wherein said forcible restoration device moves said head with a counter electromotive force generated by said rotary drive motor to execute the forcible restoration action.

20. The disc drive apparatus according to claim 19, wherein said counter counts in response to detection of the counter electromotive force.

21. The disc drive apparatus according to claim 12, wherein said voltage input is adapted to receive voltage from a voltage source within a vehicle, and said counter counts in response to a drop in the voltage below the predetermined value following a rise in the voltage over the predetermined value.

22. A disc drive apparatus adapted to write and/or read information onto and/or from an information recording disc, with the information recording disc being rotated by a rotary drive motor and a head drive being controlled to position a head in a radial direction of the information recording disc under supply of a predetermined rated power source voltage, said disc drive apparatus comprising:

first means for controlling the head drive to execute a forcible restoration action that forcibly moves the head to a retract position when the power source voltage drops below a predetermined threshold value;

second means for detecting execution of the forcible restoration action, counting the number of times the forcible restoration action is executed, and updating a count value every time execution of the forcible restoration action is detected; and a notification device for providing a notification of the updated count value.

23. A method of controlling a disc drive apparatus that includes a head and that is powered by a rotary drive motor which receives voltage from a power source, comprising:

monitoring the power source voltage;

in response to detecting of a drop in the power source voltage below a predetermined threshold value, forcibly moving the head to a retract position;

counting the number of times the forcible moving action is executed;

providing a notification of the number of times the forcible moving action is executed.

24. The method according to claim 23, wherein the head is forcibly moved to the retract position with a counter electromotive force generated by the rotary drive motor.

25. The method according to claim 23, wherein the number of times the forcible moving action is executed is counted by counting detections of the counter electromotive force.

26. The method of claim 23, wherein the notification of the number of times the forcible moving action is executed is a visual notification.

* * * * *